(12) United States Patent
Papakipos et al.

(10) Patent No.: US 9,686,088 B2
(45) Date of Patent: Jun. 20, 2017

(54) NOTIFICATION PROFILE CONFIGURATION BASED ON DEVICE ORIENTATION

(75) Inventors: Matthew Nicholas Papakipos, Palo Alto, CA (US); Matthew Cahill, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 264 days.

(21) Appl. No.: 13/276,634

(22) Filed: Oct. 19, 2011

(65) Prior Publication Data

US 2013/0100017 A1    Apr. 25, 2013

(51) Int. Cl.
| | | |
|---|---|---|
| *G06F 3/033* | (2013.01) | |
| *H04L 12/18* | (2006.01) | |
| *H04W 52/02* | (2009.01) | |
| *G06F 1/16* | (2006.01) | |

(52) U.S. Cl.
CPC .......... *H04L 12/1845* (2013.01); *G06F 1/165* (2013.01); *G06F 1/1626* (2013.01); *G06F 1/1694* (2013.01); *H04W 52/0264* (2013.01); *Y02B 60/50* (2013.01)

(58) Field of Classification Search
CPC ..................... G06F 3/0346; H04M 2250/16
USPC ........................................................ 345/158
See application file for complete search history.

(56) References Cited

U.S. PATENT DOCUMENTS

| | | | | |
|---|---|---|---|---|
| 6,031,899 | A * | 2/2000 | Wu ........................... | 379/142.01 |
| 6,549,792 | B1 * | 4/2003 | Cannon et al. ............ | 455/550.1 |
| 6,697,473 | B2 * | 2/2004 | Batten ......................... | 379/199 |
| 6,748,243 | B1 * | 6/2004 | Kubo et al. ................ | 455/569.1 |
| 7,542,773 | B2 * | 6/2009 | Koch ........................... | 455/466 |
| 8,442,600 | B1 * | 5/2013 | Tseng ......................... | 455/575.4 |
| 2002/0039914 | A1 * | 4/2002 | Hama et al. .................. | 455/566 |
| 2002/0167488 | A1 * | 11/2002 | Hinckley et al. ............. | 345/156 |
| 2004/0081305 | A1 * | 4/2004 | Gonzalez et al. ....... | 379/207.16 |
| 2004/0224705 | A1 * | 11/2004 | Nishimura .................... | 455/466 |
| 2004/0259536 | A1 * | 12/2004 | Keskar et al. ................ | 455/418 |
| 2005/0100157 | A1 * | 5/2005 | Gray et al. ............... | 379/265.01 |
| 2005/0170803 | A1 * | 8/2005 | Jo .............................. | 455/234.1 |
| 2005/0253817 | A1 * | 11/2005 | Rytivaara et al. ............ | 345/173 |
| 2005/0259802 | A1 * | 11/2005 | Gray et al. ............... | 379/201.01 |

(Continued)

FOREIGN PATENT DOCUMENTS

| | | |
|---|---|---|
| EP | 1569127 A1 | 8/2005 |
| EP | 1748631 A1 | 11/2009 |

(Continued)

OTHER PUBLICATIONS

Define monitor downloaded Aug. 26, 2014 from http://www.thefreedictionary.com/monitor.*

(Continued)

*Primary Examiner* — Dorothy Harris
(74) *Attorney, Agent, or Firm* — Baker Botts L.L.P.

(57) ABSTRACT

In one embodiment, a user places a mobile device (e.g., a smart phone) facing downward on a table. A process running on the mobile device determines an orientation of the mobile device (i.e., a facing downward orientation), and determines that the mobile device has been in the facing downward orientation for over a threshold period of time (e.g., 3 seconds), then the process automatically selects a "Quiet" notification profile, and turn off the mobile device's display, without additional input from the user.

18 Claims, 6 Drawing Sheets

(56) References Cited

U.S. PATENT DOCUMENTS

| | | | |
|---|---|---|---|
| 2007/0004451 A1* | 1/2007 | Anderson | 455/556.1 |
| 2007/0036348 A1* | 2/2007 | Orr | 379/424 |
| 2008/0032748 A1* | 2/2008 | Choi et al. | 455/566 |
| 2008/0070593 A1* | 3/2008 | Altman et al. | 455/457 |
| 2008/0104488 A1* | 5/2008 | Cheng | H03M 13/2957 |
| | | | 714/794 |
| 2009/0003538 A1* | 1/2009 | Sharpe et al. | 379/70 |
| 2009/0167542 A1* | 7/2009 | Culbert et al. | 340/635 |
| 2010/0082745 A1* | 4/2010 | Davis et al. | 709/204 |
| 2010/0159998 A1 | 6/2010 | Luke | |
| 2011/0117971 A1* | 5/2011 | Kim et al. | 455/566 |
| 2012/0150772 A1* | 6/2012 | Paek et al. | 706/12 |

FOREIGN PATENT DOCUMENTS

| | | | |
|---|---|---|---|
| EP | 2117189 A1 | 6/2010 | |
| KR | 2007003428 A | * | 1/2007 |

OTHER PUBLICATIONS

Define periodically downloaded Aug. 26, 2014 from http://www.thefreedictionary.com/periodically.*

International Search Report and Written Opinion for International Application PCT/US2012/057417, Mar. 20, 2013.

* cited by examiner

NOTIFICATION PROFILE CONFIGURATION BASED ON DEVICE ORIENTATION

TECHNICAL FIELD

The present disclosure relates generally to mobile devices, and, more particularly, to methods of selecting a notification profile of a mobile device based on device orientation.

BACKGROUND

A mobile device (e.g., a cell phone, a tablet computer) can notify a user one or more events (e.g., a calendar reminder, an incoming call, a new email message, etc.) with different indications or notification options for different events, for example, a chime indicating a calendar reminder, a ring tone indicating an incoming call, a vibrating alert indicating a new email message, etc. Mobile devices often have multiple notification profiles suitable for different settings (e.g., "Loud", "Normal", "Quiet", "Off") and each notification profile can have a set of notification options, with a specific notification option for each event of a set of events. For example, a "Loud" notification profile may have a high-volume chime for a calendar reminder, an escalating ring tone for an incoming call, and a vibrating alert for a new email message; a "Quiet" notification profile may have a vibrating alert for a calendar reminder, a short beep for an incoming call, and no indication for a new email message. Mobile devices such as cell phones often have pre-defined notification profiles. A user can configure the pre-defined notification profiles or create a new notification profile.

SUMMARY

Particular embodiments relate to methods of selecting a notification profile of a mobile device based on device orientation. These and other features, aspects, and advantages of the disclosure are described in more detail below in the detailed description and in conjunction with the following figures.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
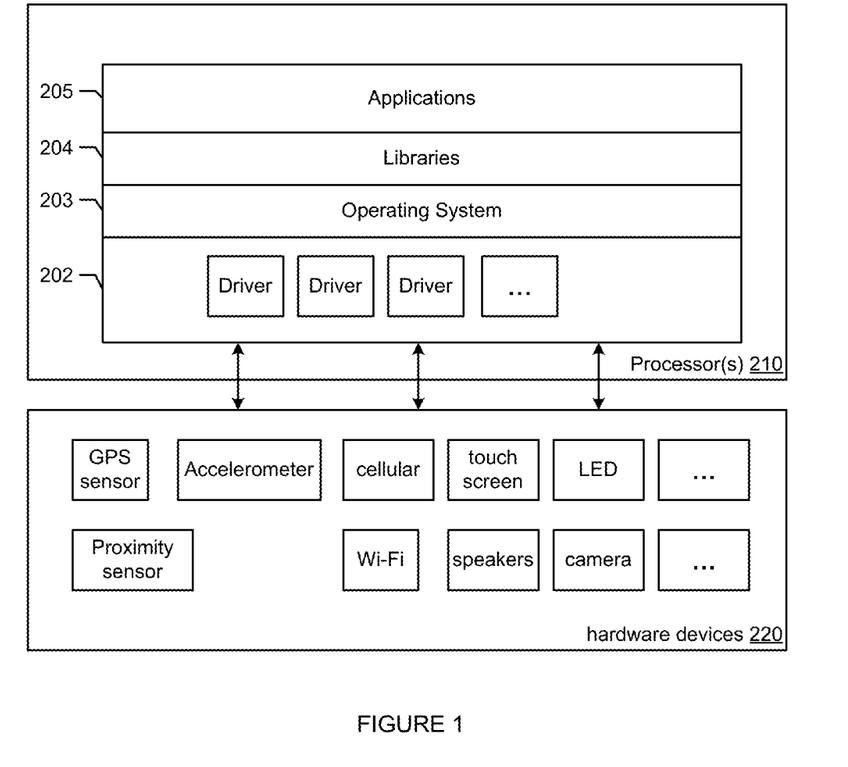
FIG. 1 illustrates an example processing stack of a mobile device.

A mobile device may have one or more notification profiles and each notification profile defines a specific indication or notification option for a specific event of a set of events. For example, a cell phone may have a notification profile consisting of three notification options for three events: a ring tone for an incoming call, a chime for a new voicemail message, and a vibrating alert for a new text message. Processing a notification of an event based on a notification profile may be implemented by combination of hardware, software, and/or firmware (or device drivers). FIG. 1 illustrates an example processing stack of a mobile device (e.g., a smart phone). In the example of FIG. 1, the mobile device may comprise hardware devices (220) such as communication interface devices (e.g., a cellular interface, a Wi-Fi interface), Input-Output (I/O) devices (e.g., a touch screen, speakers, a light-emitting diode or LED indicator, a camera, etc.), sensors (e.g., a Global Positioning System or GPS sensor, a proximity sensor, an accelerometer, etc.), and other hardware devices. One or more device drivers in driver layer 202 hosted by one or more processors 210 of the mobile device can communicate and control the hardware devices. One or more processors 210 can execute various software programs, for example, operating system 203 running one or more application programs (e.g., web browser, address book, etc.) in applications 205 and managing one or more hardware devices via the one or more device drivers in driver layer 202. Libraries 204 can include one or more libraries used by one or more application programs in applications 205.

A notification profile may be implemented by a process or thread, for example, a notification manager process running on one or more processors 210. The notification manager process can subscribe as a listener to a library function for telephony status, which communicates by a device driver with the cellular communication interface device to detect changes in telephony status (e.g., an incoming call, a new voicemail message, no cellular signal, etc.). For example, when the mobile device receives an incoming call, the notification manager process can detect the event (the incoming call) via the telephony status library function. The notification manager process can access a local storage of the mobile device for a notification profile, determine an indication or notification option for the incoming call—e.g., a flashing LED indicator with yellow light. The notification manager then can access a driver for the LED indicator (via a function call, for example), cause the LED indicator to flash yellow light in a pre-determined cadence for a pre-determined period of time.

A user of a mobile device can change an active notification profile by manually accessing a user interface for the notification profiles, and selecting one from a plurality of available notification profiles as a new active notification profile. For example, as a user sits in front of a table in a conference room preparing for an upcoming meeting, the user may change the active notification profile of his smart phone by accessing a graphic user interface of notification profiles of the phone and selecting a "Quiet" notification profile, which may have notification options such as LED flashing for a new email message, and no indication for all other events (e.g., an incoming call, a new text message, etc.). In contrast to manually selecting a notification profile, particular embodiments herein describe methods of automatically selecting a notification profile, and more specifically, methods of selecting a notification profile based on device orientation and, optionally, one or more additional conditions. As in the previous example, in one embodiment, as the user sits at a table in a conference room preparing for an upcoming meeting, the user can place his smart phone on the table with the front side of the smart phone facing downward. A process running on the smart phone can determine a physical orientation of the phone (i.e., a facing-downward orientation), and determine whether the phone has been in the facing downward orientation for a threshold period of time (e.g., over 3 seconds, etc.). If both conditions are met (i.e., 3 seconds after the user placing the smart phone facing downwards on the table), the process can automatically select the "Quiet" notification profile (or some other notification profile, such as a custom "Meeting" notification profile), without additional input from the user. In the Quiet notification profile, for example, phone calls may cause the mobile device to vibrate or pass the calls to voice mail, while SMS or other text notifications may cause the mobile device to vibrate or flash an LED or other visual indicator.

Figure 2A:
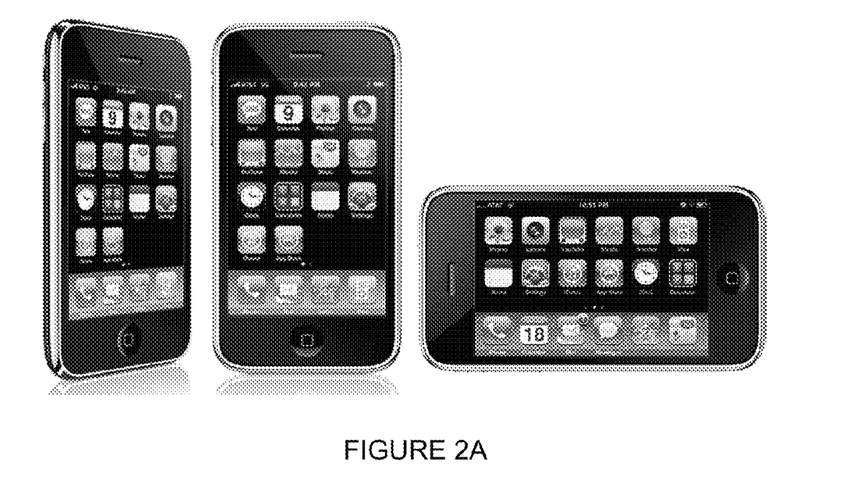
FIGS. 2A-2C illustrate example orientations of a mobile device.
Figure 2B:
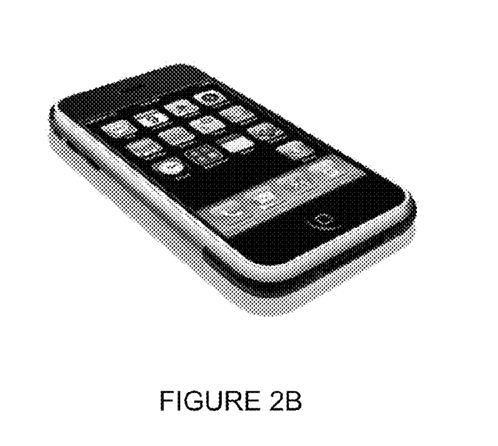
Figure 2C:
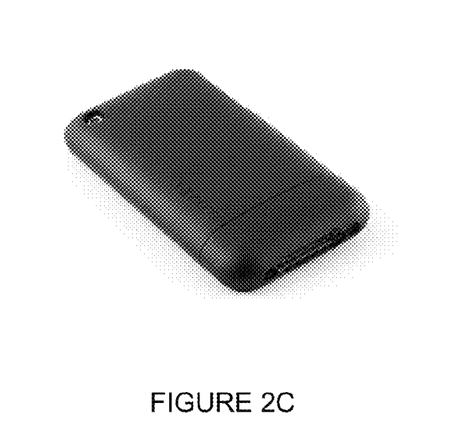

FIGS. 2A-2C illustrate example orientations of a mobile device with a display disposed on a front side of the mobile device. A user can hold the mobile device (e.g., a smart phone) vertically (or almost vertically) during a phone call or while reading contents in the mobile device's display, as illustrated in FIG. 2A. A user may place the mobile device on a horizontal surface (e.g., a table top) facing upward, as illustrated in FIG. 2B, or facing downward, as illustrated in FIG. 2C. The mobile device may comprise an accelerometer operative to detect the physical orientation of the mobile device. As illustrated in the example processing stack of FIG. 1, a device driver may receive and process orientation data from the accelerometer, while a program hosted by one or more processors of the mobile device may determine a current orientation of the mobile device or detect a change in the orientation by subscribing as a listener to a library function that interprets orientation data from the accelerometer's device driver.

Figure 3:
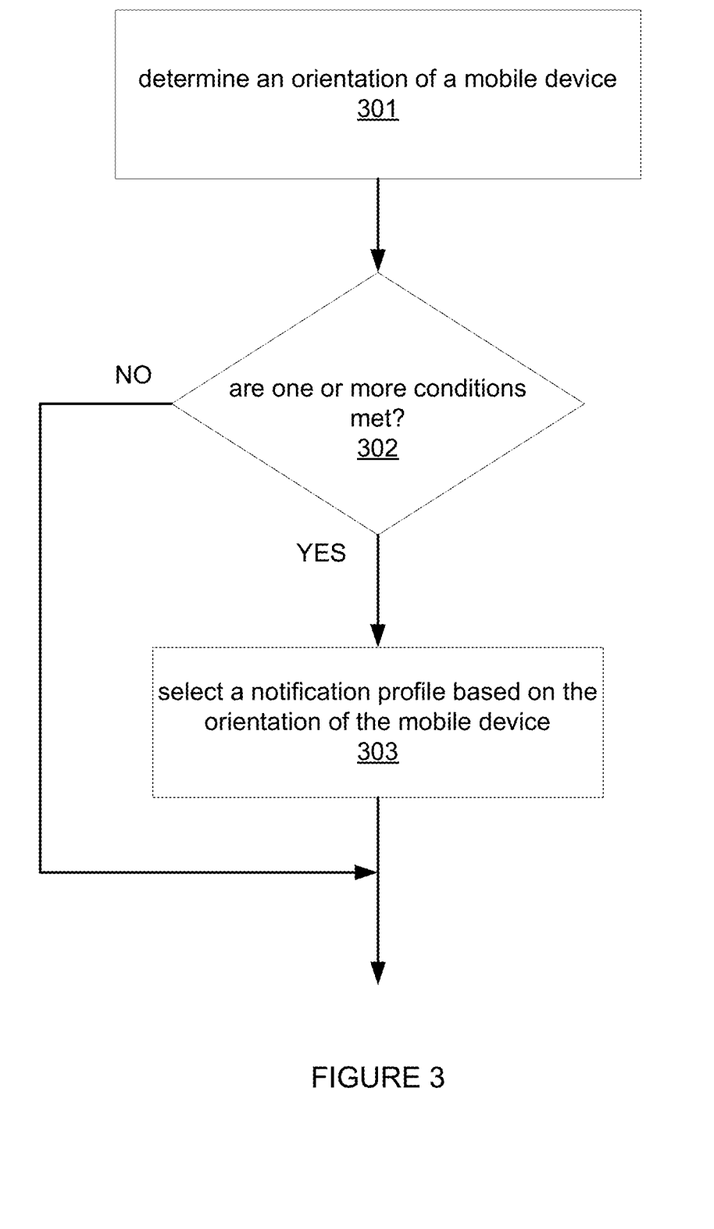
FIG. 3 illustrates an example method of selecting a notification profile of a mobile device based on device orientation.

FIG. 3 illustrates an example method of selecting a notification profile of a mobile device based on the physical orientation of the mobile device. The example method of FIG. 3 may be implemented by a notification profile manager process executed by one or more processors of the mobile device. In particular embodiments, the mobile device (e.g., a mobile phone, a smart phone, a tablet computer, etc.) may comprise an orientation sensor (e.g., an accelerometer). In particular embodiments, the mobile device may comprise a first display (e.g., a touch screen) disposed on a front side of the mobile device. In particular embodiments, the mobile device may comprise one or more hardware devices that can be used alone or in combination for presenting notifications (or presenting indications) of one or more events to the mobile device's user. Example hardware devices include speakers for audible alerts, LEDs and other lights for visual alerts, displays for visual alerts, and vibrating systems for haptic alerts. A notification profile can be set to use one or more notification methods for a given event type (such as incoming call, SMS/text, chat message, notification, or email). That is, each event type can include a set of selected notification methods. Each notification profile may represent a selection of notification methods for a set of event types. For example, pursuant to a "Normal" profile, the mobile device's speakers can play a ring tone or a chime to indicate an incoming call. The mobile device's touch screen can display caller information (e.g., a name and a profile picture) of an incoming call. The mobile phone's LED indicator can flash and the speaker can emit a tone to indicate a new email message. For example, the mobile device's vibrating system comprising an offset weight attached to a motor can produce a vibrating alert to indicate a calendar reminder.

The mobile device may have one or more pre-configured notification profiles (e.g., notification profiles configured by the mobile device's manufacture). In other embodiments, the mobile device's user may access a user interface of the notification profile manager process to select a notification profile from a plurality of notification profiles, configure an existing notification profile, and/or create a notification profile, and cause the notification profile manager process to store the selection and/or configuration in a local storage of the mobile device. In particular embodiments, each notification profile of the plurality of notification profiles may comprise notification options, wherein each notification option comprises an specific indication for a specific event type of a plurality of events (e.g., incoming call, SMS/text, email, chat message, and the like). For example, in a "Silent" notification profile, SMS or other text notifications may cause the mobile device to flash an LED, while phone calls may cause the mobile device to pass the calls to voice mail. In some embodiments, a selection of a notification profile may cause changes in states of one or more hardware devices. For example, after a user selects the "Silent" notification profile, the mobile device may power down the mobile device's display. In one implementation, the notification profile that is manually selected by a user can be a default notification profile that is used by default, except when one or more pre-configured device orientations and/or other conditions are met.

In particular embodiments, the notification profile manager process may determine an orientation of the mobile device (301). For example, the notification profile manager process may periodically access the orientation sensor's device driver via a library function call and determine an orientation of the mobile device (e.g., a facing downward orientation, or a vertical orientation). In particular embodiments, the notification profile manager process may determine whether one or more additional conditions are met (302). If the one or more conditions are met, the notification profile manager process may select a notification profile based on the orientation of the mobile device (303). For example, the notification profile manager process may periodically access the orientation sensor and record the determined orientation in association with a time stamp. The notification profile manager may repeat this polling and recording step to develop an orientation history. If a sliding window of the orientation history indicates that the mobile device is in a select physical orientation for a threshold period of time, the notification profile manager process may transition from a current notification profile to another notification profile, such as a "Quiet" or "Meeting" notification profile.

Figure 3A:
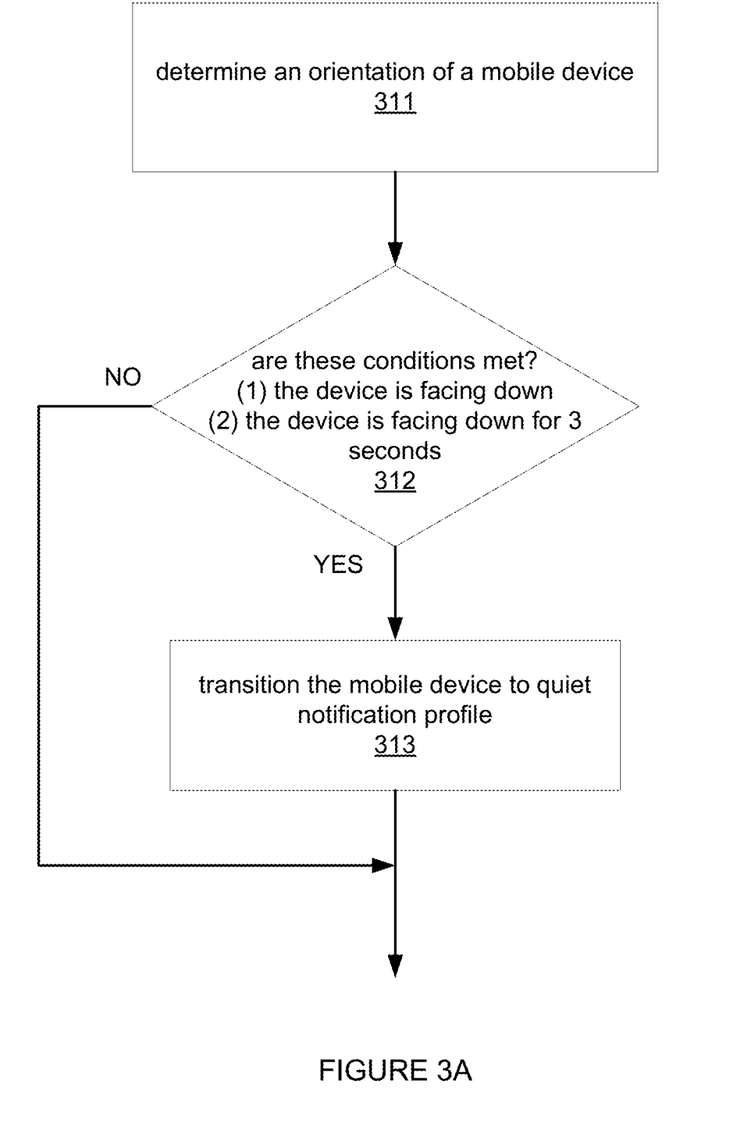
FIG. 3A illustrates an example method of selecting a quiet notification profile based on device orientation.

The example method of FIG. 3 can be further illustrated by FIG. 3A. FIG. 3A illustrates an example method of selecting a quiet notification profile when a mobile device is placed on a horizontal surface facing downward. In particular embodiments, the notification profile manager process may determine an orientation of a mobile device (311). In particular embodiments, the notification profile manager process may determine (1) whether the mobile device is facing down, and (2) whether the device is facing down for a threshold period of time (e.g. 3 seconds) (312). In particular embodiments, if the notification profile manager process determines both conditions (1) and (2) are met, the notification profile manager process may transition the mobile device from a current notification profile to a quiet notification profile. For example, a user may place the mobile device facing downward on a table, and if the notification profile manager process determines the mobile phone has been facing downward for 3 seconds, the notification profile manager process may transition to the quiet notification profile, and transition the mobile device's front-facing display to a lower power state (e.g., power-off). For example, the quiet notification profile may have notification options including flashing red light by the mobile device's LED indicator to indicate a new email or text message, flashing yellow light by the mobile device's LED indicator to indicating a calendar reminder, and a vibrating alert by the mobile device's vibrating system to indicating an incoming call.

Figure 4:
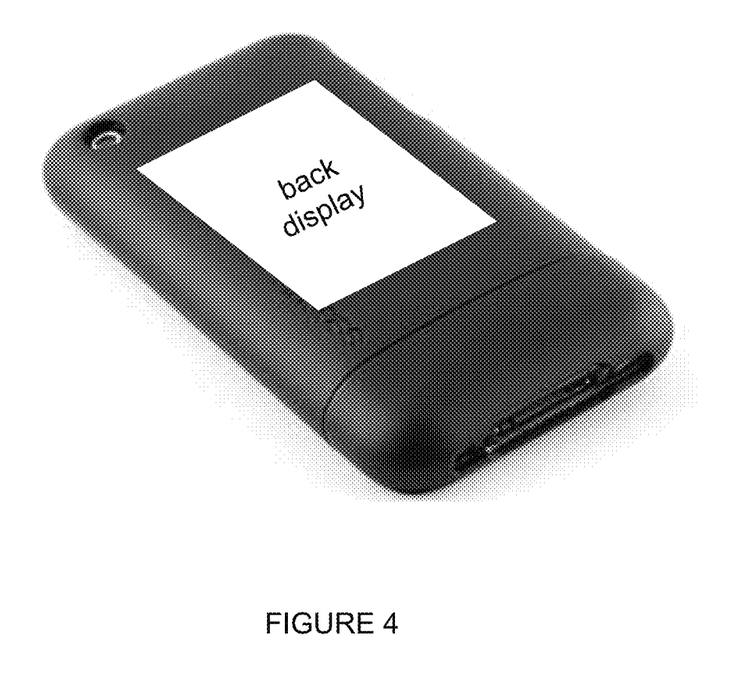
FIG. 4 illustrates an example back-side display of a mobile device.

In some embodiments, the mobile device may comprise a second display disposed on a back side of the mobile device. FIG. 4 illustrates an example back-side display of the mobile device illustrated in FIG. 2C. As the mobile device is in a facing downward orientation for a threshold period of time, as in the example method of FIG. 3A, the second display disposed on the back side of the mobile device is facing upwards (as illustrated in FIG. 4) and can be used to display additional information. For example, the notification profile manager process may access the mobile device's GPS sensor (e.g., via a function call) for a current location of the mobile device, and display a map including the current location in a graphic user interface in the second display. For example, in response to an incoming call, the notification profile manager process may display caller identification information (e.g., a phone number, a name, a profile picture) in the second display. For example, the notification profile manager process may display a sender name (or email address), and a subject description of a new email message. For example, the notification profile manager process may access one or more data stores for advertisements and the mobile device's user's social contacts that are near the current location, and display the nearby advertisements and social contacts overlaying the map including the current location. For example, the notification profile manager process may based on a user identifier of a social networking system for the mobile device's user, access one or more remote data stores for one or more newsfeeds and related media contents, and display the newsfeeds and the related media contents in the second display. U.S. Patent Application Publication No. 2012/0144343, entitled User Interface with Media Wheel Facilitating Viewing of Media Objects, which describes methods of displaying media contents of newsfeeds in a media wheel user interface, is herein incorporated by reference in its entirety and for all purposes. For example, the notification profile manager process may access a local data store of media content (e.g., a photo folder of the mobile device) and display the media content in a media wheel user interface in the second display. For example, the notification profile manager may access one or more data stores for one or more publications (e.g., electronic books, web articles) and display the one or more publications in a graphic user interface in the second display.

In some embodiments, the second display of the mobile device may comprise a display technology different from the first display of the mobile device, for example, the second display may be a lower-power display suitable for display electronic books. For example, in an event of an incoming call, the notification profile manager may access a data store to determine caller identifier based on the incoming call's phone number, and access one or more data stores for information associated with the caller identifier (e.g., the caller's profile picture) and display the caller identifier and associated information in a graphic user interface in the second display, as described by U.S. Patent Application Publication No. 2012/0196581, entitled Caller Identification Using Social Network Information, which is herein incorporated by reference in its entirety and for all purposes.

With the example method of FIG. 3, a user may "pick up" an incoming call by flipping over his mobile phone with the example method of FIG. 3. In particular embodiments, the notification profile manager process may determine an orientation of a mobile device (301). In particular embodiments, the notification profile manager process may determine whether (1) the mobile device is in a first orientation while receiving an incoming call, (2) the first orientation is a facing downward orientation, (3) the mobile device is in a second orientation after being in the first orientation, and (4) the second orientation is a facing upward orientation or a vertical orientation. In particular embodiments, if the notification profile manager process determines all four conditions (1), (2), (3), and (4) are met (302), the notification profile manager process may transition the mobile device to a communication profile (303). For example, a user of a mobile phone may place the mobile phone facing downward on a table. When an incoming call occurs while the mobile phone is in the facing downward orientation, the user may flip over the phone (so the phone is facing upwards) or pick up the phone (so the phone is in a vertical orientation), the notification profile manager process running on the mobile phone may determine that all four conditions described above are met, and the notification profile manager process may transition the mobile phone to a communication profile, and connect the incoming call, or access one or more data stores and display caller identification information of the incoming call in the mobile phone's display. For example, the communication profile may have notification options including a vibrating alert for a new voicemail or email message, and a short beep for a second incoming call.

Similar to the example above, a user may "hang up" a phone call on his mobile phone by placing the mobile phone on a horizontal surface facing downward. In particular embodiments, the notification profile manager process may determine an orientation of a mobile device (301). In particular embodiments, the notification profile manager process may determine whether (1) the mobile device is in a communication session (e.g., a phone call, a voice call, a voice-over-internet-protocol or VOIP call) while in a first orientation, (2) the mobile device is in a second orientation after being in the first orientation, and (3) the second orientation is a facing down orientation and is different from the first orientation. In particular embodiments, if the notification profile manager process determines all three conditions (1), (2), and (3) are met (302), the notification profile manager process may transition the mobile device to a quiet profile (303). For example, a user of a mobile phone may hold the mobile phone next to his ear during a phone call (i.e., the mobile phone is in a vertical or almost vertical orientation), after the user places the phone facing downward on a table, the notification profile manager process running on the mobile phone may determine that all three conditions described above are met, the notification profile manager process may transition the mobile phone to a quite profile, and suspend the phone call (e.g., putting the phone on mute), or end the phone call. For example, the quiet profile may have notification options including flashing red light by the mobile device's LED indicator to indicate a new email, text or voicemail message, and a ring tone indicating an incoming call. For example, the user may place the mobile phone on a table facing upwards during a phone call (e.g., using the mobile phone's speakers and microphone), and the user can end or mute the phone call by simply flipping over the phone (so the phone is facing downwards on the table).

A user may select a "Face-up" notification profile by placing the mobile phone a horizontal surface facing upwards. In particular embodiments, the notification profile manager process may determine an orientation of a mobile device (301). In particular embodiments, the notification profile manager process may determine whether (1) the mobile device is in a facing upwards orientation on a horizontal surface, and (2) the mobile device is in the facing upwards orientation on a horizontal surface for a threshold period of time (e.g., one minute). In particular embodiments, if the notification profile manager process determines conditions (1) and (2) are met (302), the notification profile manager process may transition the mobile device to a face-up notification profile (303). For example, a user of a mobile phone may place the mobile phone on a flat table top facing upwards, and if the notification profile manager process determines the mobile phone has been facing upwards on a horizontal surface for one minute, the notification profile manager process may transition the mobile phone to the face-up profile. For example, the face-up notification profile may have notification options including a ring tone indicating an incoming call, and a chime indicating a new email, text or voicemail message, while the notification profile manager process may cause the mobile phone to display one or more newsfeeds for the user in the mobile phone's front-side display.

In addition to the accelerometer, the mobile device may comprise other sensors that alone or in combination can determine a notification profile and/or how the mobile device may behave for a notification profile. For example, the notification profile manager process may determine a current location of the mobile device by accessing a GPS sensor, a cellular communication interface (e.g., for cellular tower triangulation), and/or a Wi-Fi communication interface (e.g., for identifying Wi-Fi hotspots), and display a map including the current location in the mobile phone's front-side display for the face-up notification profile described above. For example, the notification profile manager process may access a front-side light sensor (e.g., via a function call) and determine the mobile device is in darkness, and power down the mobile device's front-side display for the face-up notification profile (e.g., the mobile phone is facing upwards but in a drawer). For example, the notification profile manager may access a front-side light sensor and a back-side light sensor, and determines that the front-side light sensors detects darkness and the back-side light sensor detects light (i.e., the mobile device is facing downward) for a threshold period of time (e.g., 3 seconds), the notification profile manager process may transition the mobile device to the quiet notification profile described above. For example, the notification profile manager may access a front-side proximity sensor and a back-side proximity sensor and determine that both proximity sensors detect nearby objects (e.g., the mobile device is in a user's pocket or backpack) for a threshold period of time (e.g., two minutes), the notification profile manager may transition the mobile device to the "Loud" notification profile describe above. For example, the notification profile manager process may determine a current time (e.g., via a system call) and if the current time corresponds to night time (e.g., between 10 PM and 6 AM), the notification profile manager process may transition the mobile phone to the "Silent" notification profile described above, regardless of the mobile device's orientation or surrounding.

In addition to selecting a notification profile, a mobile device's orientation can influence other notification parameters associated with the mobile device. For example, U.S. Patent Application Publication No. 2013/0054706, entitled Modulation of Visual Notification Parameters Based on Message Activity and Notification Value, herein incorporated by reference in its entirety and for all purposes, described methods of modulating notification or operating parameters of an LED message indicator of a user's mobile device based on message activity and affinity value. For example, the LED message indicator can be modulated to present a rapid red heartbeat for messages with high affinity values associated with the user (e.g., messages from the user's declared relationships such as parents, boyfriend, or girlfriend), and can be modulated to present a moderate green heartbeat for a message queue with moderate message activities (e.g., there are 3 messages in the past hour, while there is no messages with high affinity values). The modulation of the LED message indicator can be further adjusted by the mobile device's orientation, as described hereafter. In particular embodiments, a mobile device (e.g., a mobile phone, a tablet computer) may comprise an LED message indicator disposed on a top edge of the mobile device. The LED message indicator is capable of emitting lights in different colors (e.g., red, yellow, green), in different rates and/or in different duty cycles. In particular embodiments, a message activity monitoring application running on the mobile device may monitor for messages corresponding to one to a plurality of different applications (e.g., email, IM, chat, SMS, voice mail, etc.), and determine message activities and affinity values associated with the messages. By subscribing as a listener to a library function that interprets orientation data from the mobile device's accelerometer's device driver, the message monitoring application may modulate one or more operating parameters (e.g., color, rate, duty cycle, etc.) of the LED message indicator of the mobile device based on the mobile device's orientation, message activity and affinity value.

For example, the message monitoring application may determine (1) whether the mobile device is in a vertical orientation (as illustrated in FIG. 2A), and (2) whether the mobile device is in a vertical orientation for a threshold period of time (e.g., 10 seconds). If the message monitoring application determines both conditions (1) and (2) are met, the message monitoring application can modulate the LED message indicator to present a rapid red heartbeat for messages with high affinity values, or modulate the LED message indicator to present a moderate green heartbeat for a message queue with moderate message activities. For example, the message monitoring application may determine (1) whether the mobile device is in a facing downward orientation (as illustrated in FIG. 2C), and (2) whether the mobile device is in a facing downward orientation for a threshold period of time (e.g., 20 seconds). If the message monitoring application determines both conditions (1) and (2) are met, the message monitoring application can modulate the LED message indictor to present a rapid red heartbeat for messages with high affinity values, and turns off the LED if there is no messages with high affinity values.

Figure 5:
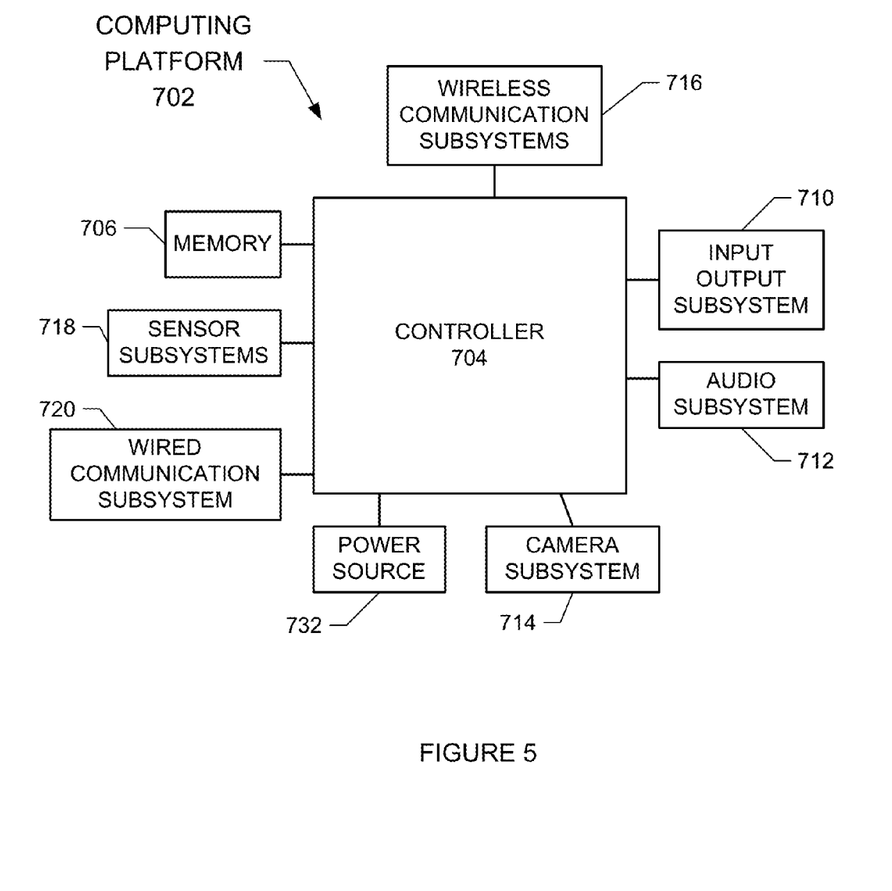
FIG. 5 illustrates an example mobile device platform.

The notification profile functionality described above can be implemented as a series of instructions stored on a computer-readable storage medium that, when executed, cause a programmable processor to implement the operations described above. While the mobile device may be implemented in a variety of different hardware and computing systems, FIG. 5 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, Unix Linux-based, Android-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11 a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network).

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device. In particular embodiments, various components of computing platform 702 may be operably connected together by one or more buses (including hardware and/or software). Additionally, computing platform 702 may be powered by power source 732.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101 . Herein, reference to a computer-readable storage medium excludes transitory forms of signal transmission (such as a propagating electrical or electromagnetic signal per se) to the extent that they are not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A device comprising:
   one or more processors;
   one or more sensors coupled to the processors; and
   a memory coupled to the processors comprising instructions executable by the processors, the processors being operable when executing the instructions to:
      repeatedly and at predefined intervals of time, periodically access an orientation sensor to determine an orientation of the device at a plurality of instances;
      storing the orientation of the device at the plurality of instances to develop an orientation history;
      using a sliding window on the orientation history to determine that the device has been in a current orientation for at least a threshold period of time and that the current orientation corresponds to a particular one of a plurality of notification profiles of the device, wherein in at least one of the notification profiles an operating parameter of an indication of an incoming message is modulated according to an affinity value of the incoming message with respect to a user of the device;
      in response to determining that the device has been in the current orientation for at least a threshold period of time and that the current orientation corresponds to a particular one of the notification profiles, determine that one or more conditions for transitioning the device to the particular one of the notification profiles are met, wherein at least one of the conditions comprises the device being in the current orientation of down-ward facing such that a backside of the device faces upward for at least a pre-determined amount of time;
      in response to determining that the conditions are met, automatically transition the device to the particular one of the notification profiles associated with a quiet mode; and
      while the device is in the down-ward facing position and operating according to the particular one of the notification profiles in the quiet mode, displaying content on a first display disposed on the back side of the device while maintaining a second display disposed on a front side of the device in a powered off state.

2. The apparatus of claim 1, wherein:
   the content comprises an indication of the current location of the device; and
   the graphical user interface comprises a map comprising the indication.

3. The apparatus of claim 2, wherein the content comprises an indication of a current location of a social contact of a user of the device.

4. The apparatus of claim 1, wherein the content comprises a newsfeed generated by a social networking system, the processor being operable to access one or more remote data stores, based on a user identifier of the social networking system for the user of the device, to obtain the newsfeed.

5. The apparatus of claim 1, wherein the content comprises a publication.

6. The apparatus of claim 1, wherein the content comprises caller-identification information of an incoming call.

7. The apparatus of claim 1, wherein:
   a first one of the conditions is the device being in a first pre-determined orientation;
   a second one of the conditions is the device being in the first pre-determined orientation while in a communication session;
   a third one of the conditions is the device being in a second pre-determined orientation after being the first pre-determined orientation, the second pre-determined orientation comprising the current orientation that is the downward-facing orientation and different from the first pre-determined orientation; and
   the particular one of the notification profiles is a quiet notification profile.

8. The apparatus of claim 7, wherein the communication session is automatically suspended in connection with the device being transitioned to the quiet notification profile.

9. The apparatus of claim 7, wherein the communication session is automatically terminated in connection with the device being transitioned to the quiet notification profile.

10. The apparatus of claim 1, further comprising:
    while the device is operating according to the particular one of the notification profiles, receiving an incoming call;
    determining that the device has transitioned to a new pre-determined orientation, the new pre-determined orientation being an upward-facing or vertical orientation; and
    transitioning the device from the particular one of the notification profiles to another one of the notification profiles that is a communication profile.

11. The apparatus of claim 10, wherein the incoming call is automatically connected in response to the device being transitioned to the communication profile.

12. The apparatus of claim 10, wherein caller-identification information is automatically displayed on the device in response to the device being transitioned to the communication profile.

13. The apparatus of claim 1, wherein at least one of the notification profiles is a pre-configured notification profile.

14. A method comprising:

by a computing device, repeatedly and periodically accessing an orientation sensor to determine an orientation of the computing device at a plurality of instances;

by the computing device, storing orientation of the device at each of the plurality of instances to develop an orientation history;

by the computing device, using a sliding window on the orientation history to determine that the device has been in a current orientation for at least a threshold period of time and that the current orientation corresponds to a particular one of a plurality of notification profiles of the device, wherein in at least one of the notification profiles an operating parameter of an indication of an incoming message is modulated according to an affinity value of the incoming message with respect to a user of the device;

by the computing device:
  in response to determining that the device has been in the current orientation for at least a threshold period of time and that the current orientation corresponds to a particular one of the notification profiles, determining that one or more conditions for transitioning the computing device to the particular one of the notification profiles are met, wherein at least one of the conditions comprises the computing device being in the current orientation of down-ward facing such that a backside of the device faces upward for at least a pre-determined amount of time;
  in response to determining that the conditions are met, automatically transitioning the computing device to the particular one of the notification profiles associated with a quiet mode; and
  while the device is in the down-ward facing position and operating according to the particular one of the notification profiles in the quiet mode, displaying content on a first display disposed on the back side of the device while maintaining a second display disposed on a front side of the device in a powered off state.

15. The method of claim 14, wherein the content comprises an indication of the current location of a social contact of a user of the device.

16. The method of claim 14, wherein the content comprises a newsfeed generated by a social networking system, the processor being operable to access one or more remote data stores, based on a user identifier of the social networking system for the user of the device, to obtain the newsfeed.

17. The method of claim 14, wherein the content comprises a publication.

18. The method of claim 14, wherein the content comprises caller-identification information of an incoming call.

* * * * *